United States Patent
Cannon et al.

(10) Patent No.: US 6,603,855 B1
(45) Date of Patent: Aug. 5, 2003

(54) CORDLESS PHONE NOTIFICATION OF EXTENDED OFF-HOOK USING PARALLEL SET DETECTION

(75) Inventors: Joseph M. Cannon, Harleysville, PA (US); James A. Johanson, Macungie, PA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/422,238

(22) Filed: Oct. 21, 1999

(51) Int. Cl.[7] ................................................ H04M 1/00
(52) U.S. Cl. ........................ 379/377; 379/396; 379/164
(58) Field of Search ............................ 379/396, 388.02, 379/382, 377, 164, 165

(56) References Cited

U.S. PATENT DOCUMENTS

| | | | | |
|---|---|---|---|---|
| 5,388,153 A | * | 2/1995 | Burger et al. | 379/164 |
| 5,392,334 A | * | 2/1995 | O'Mahony | 379/67.1 |
| 5,506,891 A | * | 4/1996 | Brown | 379/377 |
| 5,535,265 A | * | 7/1996 | Suwandhaputra | 379/140 |
| 5,592,529 A | * | 1/1997 | Linsker | 379/424 |
| 5,606,593 A | * | 2/1997 | Smith | 379/161 |
| 5,764,758 A | * | 6/1998 | Shen | 379/372 |
| 5,812,649 A | * | 9/1998 | Shen | 379/142 |
| 5,838,777 A | * | 11/1998 | Chang et al. | 379/142.01 |
| 5,978,461 A | * | 11/1999 | Anderson | 379/168 |
| 6,005,934 A | * | 12/1999 | Pepper | 379/398 |
| 6,122,353 A | * | 9/2000 | Brady et al. | 379/142 |
| 6,134,321 A | * | 10/2000 | Pitsch | 379/399 |
| 6,219,411 B1 | * | 4/2001 | Peters et al. | 379/177 |
| 6,359,973 B1 | * | 3/2002 | Rahamim et al. | 379/93.05 |

* cited by examiner

Primary Examiner—Rexford Barnie
(74) Attorney, Agent, or Firm—William H. Bollman

(57) ABSTRACT

An on-hook EOH indicating telephone includes a parallel set detector, an EOH signal detector, and an indication module to activate a configurable audible and/or visual alert indicating that another telephone is off-hook and should be hung up. The audible alert may be a unique ringing of the otherwise conventional ringer (e.g., every 5 minutes, at a unique cadence or frequency, etc.), or may be an audible tone output from the speaker of the on-hook EOH indicating telephone. The visible alert may be, e.g., a text message on a display of the on-hook EOH indicating telephone, a blinking, flashing, etc. of an LED, or other visible attention getting technique. When the central office presents the extended off-hook (EOH) notification signal to the desired telephone line, the invention-equipped telephone detects a parallel set in use, and then listens for the EOH signal. Upon receiving the EOH signal, the inventionequipped telephone will uniquely ring, visibly illuminate, flash, or otherwise alert the users in the household that another telephone is off-hook. This audible and/or visible alert at the on-hook EOH indicating telephone is over and above that audibly output by the parallel telephone which caused the receipt of the EOH signal.

28 Claims, 3 Drawing Sheets

CORDLESS PHONE NOTIFICATION OF EXTENDED OFF-HOOK USING PARALLEL SET DETECTION

BACKGROUND OF THE INVENTION

1. Field of the Invention

This invention relates generally to the rectification of an extended off-hook condition of an unused telephone line by customer premises equipment. More particularly, it relates to the presentation of an improved off-hook notification to a user of a telephone line including a telephone receiver left in an extended off-hook condition.

2. Background of Related Art

At various times, a telephone line may be inadvertently placed in an off-hook condition for an extended period of time even when the telephone line is not in an established telephone call. For instance, the receiver may not be properly returned to the cradle of the telephone system after a telephone call, or a handset may be accidentally dislodged from the cradle of its telephone system or base unit, etc. When in an off-hook condition, the telephone line is typically incapacitated because, e.g., it is not able to audibly ring the telephone when a new incoming call is received. Thus, it is desirable to have the user of the telephone correct the problem, e.g., physically hang up the handset to avoid lost incoming calls.

When an extended off-hook condition occurs, the telephone company central office conventionally sends a high energy extended off-hook (EOH) notification signal to the telephone line. Presumably, the off-hook handset or speaker will output the received high energy EOH signal as a loud audible tone. If the user of the telephone line is within an audible distance of the off-hook receiver, they will presumably hear the receiver off-hook notification signal, recognize the problem, and subsequently return the off-hook receiver into its proper place to return the telephone line to an on-hook condition. If the user of the telephone line is not within an audible distance of the off-hook receiver, the telephone line will remain in an off-hook condition until noticed at a later time by the user. Typically, the audible EOH tone is terminated after a predetermined amount of time, and the telephone line may be temporarily disconnected at the central office until the off-hook condition is corrected.

FIG. 6 illustrates a conventional telephone system capable of receiving an extended off-hook (EOH) notification signal from the telephone company central office.

In particular, in FIG. 6, a telephone system 11 is connected to a telephone company central office 13 via a telephone line 15. The telephone company central office 13 is typically considered to be a part of the public switched telephone network 17.

The telephone system 11 includes a telephone base unit 19 having a cradle 21 for receiving a handset 23. When the handset 23 is properly placed in the cradle 21, a switch in the telephone notifies a telephone line interface in the telephone system 11 to place the telephone line in an on-hook condition. In an on-hook condition the telephone system 11 is capable of receiving an incoming telephone call (and of placing an outgoing telephone call) over the telephone line 15.

If the handset 23 is inadvertently displaced or otherwise removed from the cradle 21 of the telephone base unit 19 of the telephone system 11 for an extended period of time when the telephone system 11 is not in use, the telephone company central office 13 will detect such an off-hook condition and recognize that the telephone system 11 is not in an established telephone call. Thus, in an attempt to notify the user to rectify the situation, the central office 13 will output an extended off-hook (EOH) notification signal to the telephone line 15 for audible and/or visual display at the off-hook telephone system 11. The receiver off-hook notification signal can be audibly heard (and/or visually observed using an appropriate display) to a user within an audible and/or visual distance of the handset 23.

Unfortunately, many times a user is no longer within an audible distance of the handset 23 when the extended off-hook (EOH) notification signal is finally presented by the telephone company central office 13 over the telephone line 15. For instance, the user may have been on their way out of the house to drive to the office as soon as they completed the last telephone call using the offending telephone system 11, and may no longer be in the house when the extended off-hook (EOH) notification signal is finally transmitted by the central office 13 to the user's off-hook telephone system 11, or may return after the unsuccessful extended off-hook (EOH) signal is no longer being transmitted by the central office 13. As another example, a user may inadvertently or unknowingly activate a "talk" or "phone" button on the handset of a remote cordless telephone, unintentionally causing the telephone line to go off-hook.

Thus, since the user may not be within an audible and/or visual distance of the off-hook handset 23 when the extended off-hook (EOH) signal is received, they will likely not realize that the handset 23 is in an off-hook condition. As a result, the user will then not be able to receive incoming telephone calls over the telephone line 15 or to record incoming voice messages on an appropriate voice messaging system. Many hours of telephone calls may be lost due to the inadvertent off-hook condition of the telephone system 11. Another disadvantage is that the status of the called telephone line is unknown to the caller when receiving a busy signal.

Accordingly, there exists a need for an apparatus and method having an improved alerting mechanism and method which has an increased probability of success, i.e., having the user return the off-hook receiver 13 to the on-hook state.

SUMMARY OF THE INVENTION

In accordance with the principles of the present invention, in an on-hook telephone device, a capability to inform a user of an extended off-hook condition in a parallel telephone set comprises a parallel set detector to detect an off-hook condition of a parallel telephone set. An extended off-hook signal detector detects a presence of an extended off-hook signal from a central office while the telephone device is in an on-hook condition.

An on-hook notifying telephone of an extended off-hook condition in accordance with another aspect of the present invention comprises a telephone device, a parallel set detector in the telephone device, and an extended off-hook signal detector in the telephone device capable of detecting a presence of an extended off-hook signal on a telephone line to the telephone device while the telephone device is in an on-hook condition.

A method of indicating an extended off-hook condition of a parallel telephone set in accordance with another aspect of the present invention comprises detecting use of a parallel first telephone set on a second telephone set. While the use is detected of the parallel first telephone set, a presence of an extended off-hook signal from a central office is detected from the second telephone set. An alarm signal is output at the second telephone set relating to an extended off-hook condition of the parallel first telephone set.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to the inclusion of an audible and/or visual warning on a telephone that another telephone on the same telephone line is off-hook, as determined by the reception of an extended off-hook (EOH) signal from the central office.

In accordance with the principles of the present invention, a suitable EOH signal detection module resides in a telephone having parallel set detection, e.g., in a cordless telephone. When the central office presents the extended off-hook (EOH) notification signal to the desired telephone line, the invention-equipped telephone detects a parallel set in use, and then listens for the EOH signal. Upon receiving the EOH signal, the invention-equipped telephone will uniquely ring, visibly illuminate, flash, or otherwise alert the users in the household that another telephone is off-hook.

Figure 1:
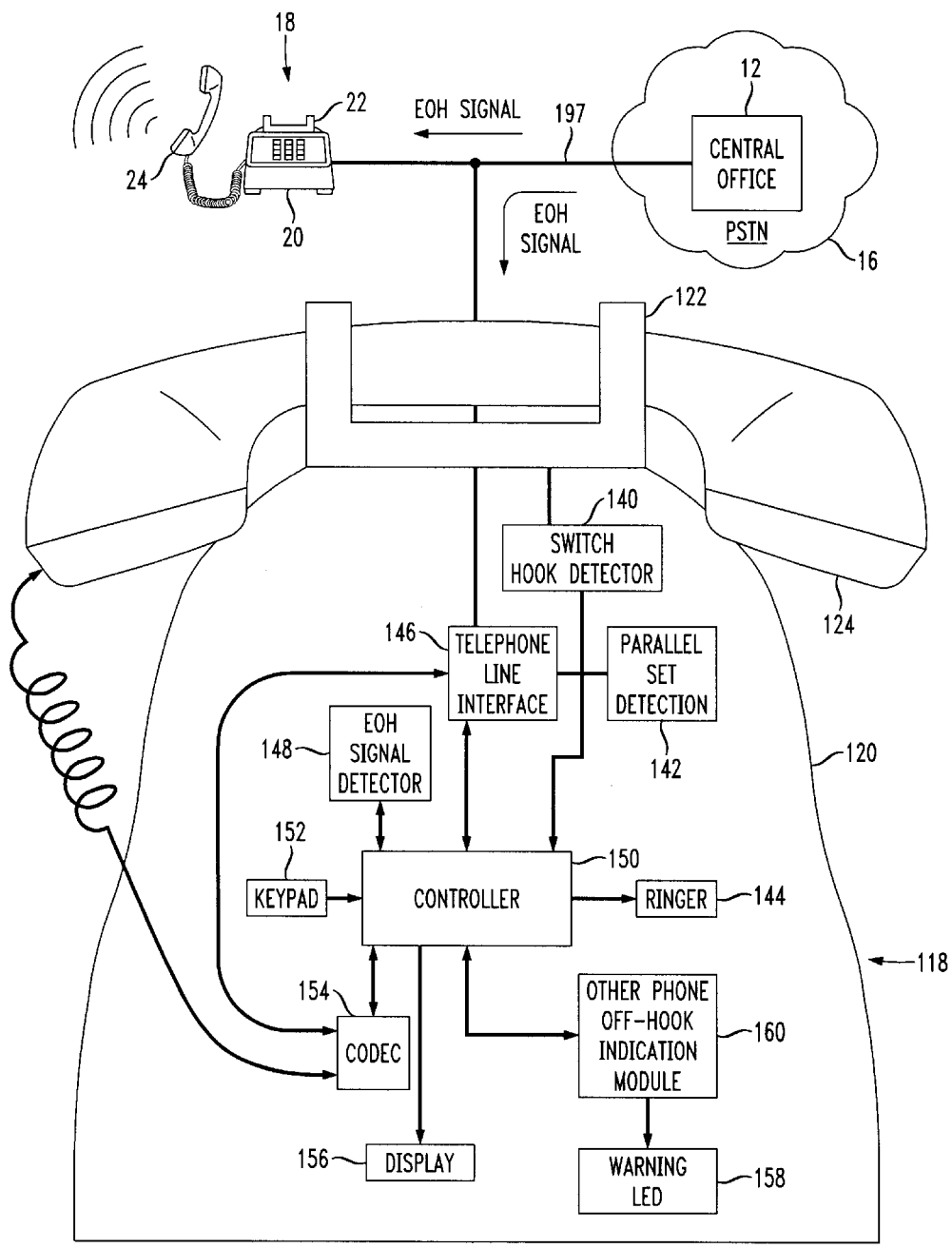
FIG. 1 shows an exemplary telephone including parallel set detection, an EOH signal detector, and an indication module for indicating that another telephone on the telephone is in an improper off-hook condition, in accordance with the principles of the present invention.

FIG. 1 shows an exemplary telephone including parallel set detection, an EOH signal detector, and an indication module for indicating that another telephone on the telephone is in an improper off-hook condition, in accordance with the principles of the present invention.

Figure 3:
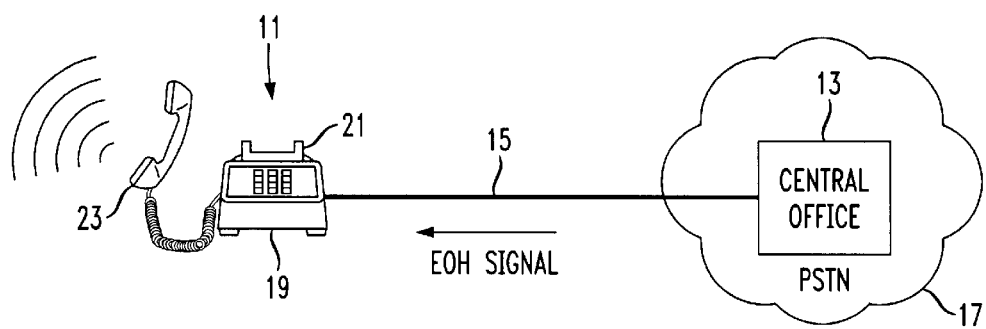
FIG. 3 shows a conventional off-hook telephone audibly outputting a received EOH signal.

In particular, in FIG. 1, a central office 12, as part of a public switched telephone network 16, detects that the receiver 24 of a telephone 18 has been in an off-hook condition (i.e., off the switch-hook 22 or base 20) without establishment of a telephone call for an impermissibly long time. In an attempt to alert the user of the telephone 18 to the extended off-hook condition, the central office 12 outputs an extended off-hook (EOH) signal on the telephone line 197, as shown and described with respect to the conventional telephone 11 shown in FIG. 3. However, the telephone line 197 is also connected to a telephone 118 including a parallel set detector 142, an EOH signal detector 148, and an audible and/or visual indication module 160 indicating that another telephone on the same telephone line 197 is presumed in an off-hook condition.

The on-hook EOH indicating telephone 118 includes a suitable telephone line interface 146, e.g., an analog or digital telephone line interface 146, depending upon the particular application. Analog signals on the telephone line 197 are digitized by a suitable codec 154.

The codec 154 may be implemented in a digital telephone (e.g., a digital cordless telephone, or a digital speakerphone), allowing an interface between the receiver handset 124 (or at least the microphone and speaker for conversing on the telephone 118) and a suitable controller 150. The codec 154 provides appropriate analog-to-digital conversion of microphone input information, and appropriate digital-to-analog conversion of information for output by a speaker or other audible output device in the telephone 118.

The controller 150 controls the overall functions of the on-hook EOH indicating telephone 118. The controller 150 may be any suitable processor, e.g., a microprocessor, a microcontroller, or a digital signal processor (DSP).

The controller 150 is provided information regarding the status of its own handset receiver 124, e.g., using a switch hook detector 140. If an extended off-hook (EOH) signal is received while the relevant telephone 118 is itself off-hook, the telephone 118 may simply place the telephone line interface 146 in an on-hook condition, essentially overriding the off-hook condition of the handset receiver 124 at least until the user realizes the problem at a later time and re-cradles the handset receiver 124.

Importantly, the on-hook EOH indicating telephone 118 further includes a parallel set detection circuit 142. The parallel set detection circuit 142 determines if another telephone is in an off-hook condition (based on the knowledge of the condition of its own handset receiver 124). Ongoing status information regarding the state of the telephone line (e.g., on-hook or off-hook) is provided to the controller 150, e.g., either through a serial or parallel interface or using an appropriate status register.

After detecting another telephone set in an off-hook condition using the parallel set detector 142, the presence of an extended off-hook (EOH) signal is monitored for on the telephone line 197. To determine the presence of the EOH signal in the incoming analog audio stream, the incoming signal is appropriately digitized in the codec 154, and passed to an EOH signal detector 148 under the control of the controller 150.

The EOH signal detector 148 determines the presence of the high energy EOH signal on the telephone line 197 through the telephone line interface 146. Either an analog circuit or a digital circuit may be used. For instance, an appropriate analog filter and/or cadence measuring circuit may be used to determine the amount of spectral energy in a predetermined range. If the detected energy in the frequency of the EOH signal is above a predetermined threshold, then an EOH signal is detected and an indication is sent to the controller 150. A similar technique may be implemented using a suitable processor and digital algorithm, after digitization of the incoming signal using the codec 154.

The controller 150 receives user input information (e.g., a dialed telephone number) via a keypad 152 (e.g., an alphanumeric keypad), and displays appropriate information on an appropriate display 156, e.g., an LCD display. The display 156 may include otherwise conventional functions, e.g., a display of the telephone number dialed, of call related information such as CallerID information, etc. Moreover, in accordance with the principles of the present invention, the display 156 may further include a visual display for indicating that another telephone on the telephone line 197 may be in an extended off-hook condition.

Alternatively, an external visible alert may be implemented. For instance, a separate (or integrated) warning LED 158 may be activated to indicate the presumed extended off-hook condition of another telephone on the telephone line 197.

The on-hook EOH indicating telephone 118 also includes an audible ringer 144. The ringer 144 provides conventional audible ringing, which may be additionally used to indicate the receipt of an EOH signal while in an on-hook condition, but preferably with distinction over otherwise conventional audible rings indicating the presence of an incoming telephone call. However, in accordance with the principles of the present invention, the ringer 144 may be operated in a unique fashion, e.g., with a unique cadence, or with a unique delay between rings. For instance, the ringer 144 may be activated periodically, e.g., every 30 seconds, every minute, every five minutes, etc., to indicate that another telephone on the telephone line 197 is presumed in an off-hook condition. Alternatively, or additionally, the ringer 144 may output a unique audible ring signal indicating that another telephone is presumed in an extended off-hook condition.

The ringer 144 is caused to output the desired audible alert signal to the user after activation by an off-hook indication module 160 indicating that another telephone is presumed off-hook.

Importantly, detection of an EOH signal while another telephone set is detected off-hook is provided audibly and/or visibly to the user within earshot or eyeshot of the on-hook EOH indicating telephone 118 under the control of an other phone off-hook indication module 160.

The other phone off-hook indication module 160 may be preconfigured by the manufacturer and/or customized by the user to indicate the presumed off-hook condition of another telephone in a desired way (i.e., visibly and/or audibly). Using the pre-configured settings, the other phone off-hook indication module 160 activates either the ringer 144, the display 156, and or the warning LED 158 in a manner which conveys an alert to the user to hang up the receiver of the other telephone.

The alert may take any particular form. For instance, the alert may take the form of any one or more of the following:

(a) A special ring (e.g., using the ringer 144 or another dedicated ringer distinct from that otherwise used to indicate an incoming telephone call.

The special ring may be frequent, e.g., every 5 or 10 seconds, or infrequent, e.g., once every 5 minutes. Moreover, the special ring (or other audible or visual signal) may be output only once, only for a predetermined period of time, or until the off-hook condition rectifies itself.

Moreover, the indication module 160 may provide indication of an extended off-hook condition long after the central office 12 has ceased transmission of the EOH signal. In this way, the user is provided with the benefit of an alert long after that conventionally provided by the central office 12.

(b) A special tone, either output by the ringer, or output digitally through the codec 154 and speaker of the remote handset 124.

(c) Display of appropriate notification text on the display 156 or other, dedicated display).

(d) Illumination of an appropriate LED, either continuously, periodically, randomly, flashing, blinking, etc. The LED may be used for other purposes as well (e.g., as power LED which flashes as an alarm condition), or the LED may be dedicated for the purpose of indicating that another telephone is in an off-hook condition and that an EOH signal has been detected.

The particular alerting method (e.g., audible and/or visual, ringer and/or tone output from speaker of handset 124, display 156 or LED 158, etc.) can be configured by the user, e.g., using the keypad 152 and display 156, and stored in an appropriate register or memory location for use by the indication module 160.

Figure 2:
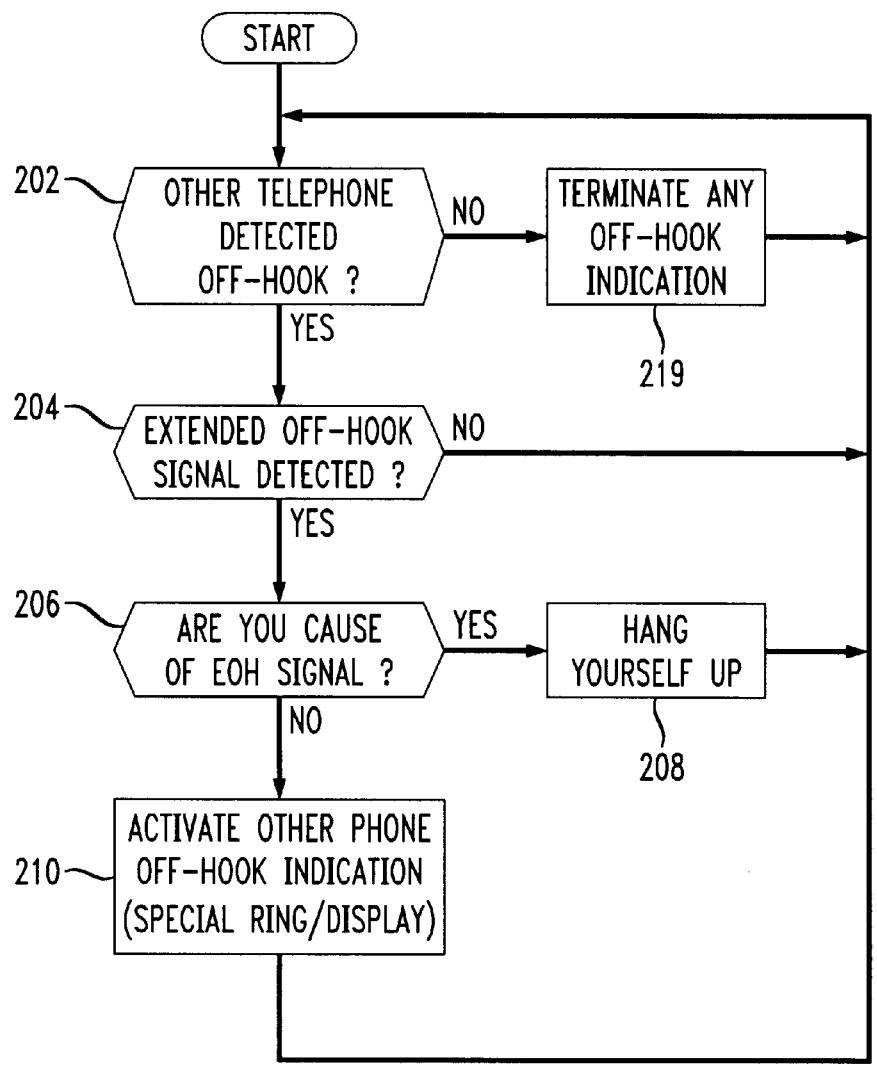
FIG. 2 shows an exemplary process flow chart in which the EOH on-hook notifying telephone shown in FIG. 1 detects that another telephone set is in an off-hook condition and that an EOH signal is being transmitted by the central office, in accordance with the principles of the present invention.

FIG. 2 shows an exemplary process flow chart in which the EOH on-hook notifying telephone shown in FIG. 1 detects that another telephone set is in an off-hook condition and that an EOH signal is being transmitted by the central office, in accordance with the principles of the present invention.

In particular, in step 202 of FIG. 2, the parallel set detector 142 determines if another telephone on the telephone line 197 is in an off-hook condition. If not, the process returns to the endless loop (or terminates). However, if a parallel set has been detected in an off-hook condition, the process continues to step 204.

In step 204, the EOH signal detector 148 determines if an extended off-hook signal is being transmitted by the central office 12. If not, the process returns to the endless loop (or terminates). However, if a parallel set is in an off-hook condition and an EOH signal is detected, the process proceeds to step 206.

In step 206, the on-hook EOH indicating telephone 118 determines if it itself is the cause of the EOH signal. If so, the controller 150 appropriately places the telephone line back in an on-hook condition in an otherwise conventional manner. Thus, if there are no parallel sets in use and the EOH signal is detected, the telephone 118 simply goes on-hook, presuming that it itself was the cause of the EOH signal. However, if the cause of the EOH signal is not the on-hook EOH indicating telephone 118 itself, the process moves on to step 210.

In step 210, the indication module 160 is informed of the condition, and causes the audible and/or visual alert in the desired manner (e.g., ringer, display, LED, etc.)

Accordingly, the audible and/or visual alert to the user provided by the inventive on-hook EOH indicating telephone 118 is in addition to the audible EOH signal output by the receiver 24 of the telephone 18 which is actually off-hook and causing the receipt of the EOH signal. Thus, the present invention provides additional alerting to the user of both telephones, increasing the probability that the user will hear or see the alert and rectify the situation.

Another embodiment in accordance with the principles of the present invention is a speakerphone capable telephone equipped with an EOH signal detector. If a parallel telephone is off-hook and an EOH signal is detected, the EOH signal can be channeled to be output directly by the speaker as an audible off-hook indication to the user.

The present invention provides many advantages. For instance, a user will be advised if a telephone is off-hook even after an EOH signal has stopped being transmitted by a central office. Moreover, if a telephone is left off-hook on one floor of a house, and the user is located on another floor of the house, the user will be notified even while out of earshot of the audible tone output by the off-hook telephone.

While the invention has been described with reference to the exemplary embodiments thereof, those skilled in the art will be able to make various modifications to the described embodiments of the invention without departing from the true spirit and scope of the invention.

What is claimed is:

1. In an on-hook telephone device, a capability to detect an extended off-hook condition relating to a parallel telephone set, comprising:

a parallel set detector to detect an off-hook condition of a parallel telephone set; and an extended off-hook signal detector to detect a presence of an extended off-hook signal from a central office while said telephone-device is in an on-hook condition.

2. In an on-hook telephone device, a capability to detect an extended off-hook condition relating to a parallel telephone set according to claim 1, further comprising:

an other telephone off-hook indication module to provide at least one of an audible and visual warning to a user of a parallel set off-hook condition based on receipt and detection of said extended off-hook signal.

3. In an on-hook telephone device, a capability to detect an extended off-hook condition relating to a parallel telephone set according to claim 2, further comprising:

a ringer;

wherein said other telephone off-hook indication module activates said ringer upon detection of a parallel set off-hook condition and receipt of an extended off-hook signal.

4. In an on-hook telephone device, a capability to detect an extended off-hook condition relating to a parallel telephone set according to claim 2, wherein:

said other telephone off-hook indication module activates a ringer.

5. In an on-hook telephone device, a capability to detect an extended off-hook condition relating to a parallel telephone set according to claim 4, wherein:

said ringer is activated in a different audible manner than in response to an incoming telephone call.

6. In an on-hook telephone device, a capability to detect an extended off-hook condition relating to a parallel telephone set according to claim 2, wherein:

said other telephone off-hook indication module activates a light.

7. In an on-hook telephone device, a capability to detect an extended off-hook condition relating to a parallel telephone set according to claim 6, wherein:

said light is an LED.

8. In an on-hook telephone device, a capability to detect an extended off-hook condition relating to a parallel telephone set according to claim 2, wherein:

said other telephone off-hook indication module activates a message on a display.

9. In an on-hook telephone device, a capability to detect an extended off-hook condition relating to a parallel telephone set according to claim 8, wherein:

said display is an LCD.

10. In an on-hook telephone device, a capability to detect an extended off-hook condition relating to a parallel telephone set according to claim 1, further comprising:

a speakerphone;

wherein a detected extended off-hook signal is output by said speakerphone when said parallel set detector detects said off-hook condition of said parallel telephone set.

11. A telephone device capable of detecting an extended off hook condition of a parallel telephone set comprising:

an interface to a network, said interface having an on-hook condition and an off-hook condition;

a parallel set detector; and an extended off-hook signal detector capable of detecting a presence of an extended off-hook signal from a central office while said interface is in said on-hook condition.

12. The telephone device according to claim 11, wherein:

an audible alarm is activated by said extended off-hook signal detector in response to receipt of an extended off-hook signal while said parallel set detector indicates use of a parallel telephone set.

13. The telephone device according to claim 12, wherein:

said audible alarm is a uniquely sounding activation of an incoming telephone call ringer.

14. The telephone device according to claim 11, wherein:

a visual alarm is activated by said extended off-hook signal detector in response to receipt of an extended off-hook signal while said parallel set detector indicates use of a parallel telephone set.

15. The telephone device according to claim 14, wherein:

said visual alarm is illumination of an LED.

16. The telephone device according to claim 14, wherein:

said visual alarm is display of a message on an LCD.

17. A method of indicating an extended off-hook condition of a parallel telephone set, comprising:

detecting use of a parallel first telephone set on a second telephone set;

while said use is detected of said parallel first telephone set, detecting a presence of an extended off-hook signal from a central office; and outputting an alarm signal at said second telephone set relating to an extended off-hook condition of said parallel first telephone set.

18. The method of indicating an extended off-hook condition of a parallel telephone set according to claim 17, wherein:

said alarm signal is output even after said extended off-hook signal ceases.

19. The method of indicating an extended off-hook condition of a parallel telephone set according to claim 17, wherein:

said alarm signal is output after said extended off-hook signal ceases and while said parallel set is detected in continued use.

20. The method of indicating an extended off-hook condition of a parallel telephone set according to claim 17, wherein said alarm signal comprises:

activation of a telephone ringer.

21. The method of indicating an extended off-hook condition of a parallel telephone set according to claim 17, wherein said alarm signal comprises:

illumination of an LED.

22. The method of indicating an extended off-hook condition of a parallel telephone set according to claim 17, wherein said alarm signal comprises:

display of a message on an LCD device.

23. Apparatus for indicating an extended off-hook condition of a parallel telephone set, comprising:

means for detecting use of a parallel first telephone set on a second telephone set;

means for detecting a presence of an extended off-hook signal from a central office while said use is detected of said parallel first telephone set; and means for outputting an alarm signal at said second telephone set relating to an extended off-hook condition of said parallel first telephone set.

24. The apparatus for indicating an extended off-hook condition of a parallel telephone set according to claim 23, wherein:

said means for outputting said alarm signal outputs said alarm signal even after said extended off-hook signal ceases.

25. The apparatus for indicating an extended off-hook condition of a parallel telephone set according to claim 23, wherein:

said means for outputting said alarm signal outputs said alarm signal after said extended off-hook signal ceases and while said parallel set is detected in continued use.

26. The apparatus for indicating an extended off-hook condition of a parallel telephone set according to claim 23, wherein said alarm signal comprises:

activation of a telephone ringer.

27. The apparatus for indicating an extended off-hook condition of a parallel telephone set according to claim 23, wherein said alarm signal comprises:

illumination of an LED.

28. The apparatus for indicating an extended off-hook condition of a parallel telephone set according to claim 23, wherein said alarm signal comprises:

display of a message on an LCD device.

\* \* \* \* \*